US012789473B2

(12) United States Patent
Shen et al.

(10) Patent No.: US 12,789,473 B2
(45) Date of Patent: Nov. 10, 2026

(54) VIBRATION WELDING METHOD AND SYSTEM

(71) Applicant: Rohr, Inc., Chula Vista, CA (US)

(72) Inventors: Shyan Bob Shen, San Diego, CA (US); Paolo Ballocchi, Dundrum (GB); Nigel J. Mckibbin, Banbridge (GB); Michael van Tooren, San Diego, CA (US); Ryan M. Robinson, San Diego, CA (US); James Alan Phillips, Ballynahinch (GB)

(73) Assignee: Rohr, Inc., Chula Vista, CA (US)

( * ) Notice: Subject to any disclaimer, the term of this patent is extended or adjusted under 35 U.S.C. 154(b) by 180 days.

(21) Appl. No.: 18/217,168

(22) Filed: Jun. 30, 2023

(65) Prior Publication Data

US 2024/0001621 A1 Jan. 4, 2024

(30) Foreign Application Priority Data

Jul. 1, 2022 (EP) .................................... 22275085

(51) Int. Cl.
*B29C 65/06* (2006.01)
*B29L 31/30* (2006.01)

(52) U.S. Cl.
CPC ........ *B29C 65/069* (2013.01); *B29C 65/0618* (2013.01); *B29C 65/0636* (2013.01); *B29L 2031/3076* (2013.01)

(58) Field of Classification Search
CPC .............................. B29C 65/069; B29C 65/08
See application file for complete search history.

(56) References Cited

U.S. PATENT DOCUMENTS

| | | | | |
|---|---|---|---|---|
| 4,601,927 | A * | 7/1986 | Durfee | B29C 66/1312 156/304.6 |
| 5,378,951 | A | 1/1995 | Snyder | |
| 9,422,024 | B2 | 8/2016 | Al-Sheyyab | |
| 10,421,236 | B1 | 9/2019 | Moore, Jr. | |
| 2013/0309001 | A1 | 11/2013 | Masatomo | |
| 2014/0191492 | A1* | 7/2014 | Al-Sheyyab | B62K 19/18 280/288.3 |
| 2015/0108793 | A1 | 4/2015 | Peschansky | |

FOREIGN PATENT DOCUMENTS

| | | | | |
|---|---|---|---|---|
| EP | 3159140 | A1 * | 4/2017 | B29C 66/81431 |
| GB | 2163124 | A | 2/1986 | |
| GB | 2163702 | A | 3/1986 | |

* cited by examiner

*Primary Examiner* — Daniel Mcnally
(74) *Attorney, Agent, or Firm* — Getz Balich LLC

(57) ABSTRACT

A method of forming a weld joint is provided. A first component having a base portion and a flange extending from the base portion is provided. A second component is provided. The second component and the flange are brought into abutment and a load is applied to the flange via the second component. The flange is biased against the second component by a reaction of the first component to the load. One of the first and the second components is vibrated to form a weld joint between at least a part of the second component and at least a part of the flange.

15 Claims, 4 Drawing Sheets

VIBRATION WELDING METHOD AND SYSTEM

This application claims priority to EP Patent Application No. 22275085.3 filed Jul. 1, 2022, which is hereby incorporated herein by reference in its entirety.

TECHNICAL FIELD

The present disclosure relates to a method of forming a weld joint, to a welding system and to a structure. In some examples, the method can be used to form hollow structures, for example hollow structures for use in aircraft components.

BACKGROUND

Various welding techniques are being developed for aircraft structures. These welding techniques include resistance welding, induction welding, ultrasonic welding and laser welding. These welding techniques, however, may require a relatively high capital investment and relatively long welding times in minutes to tens of minutes to achieve each weld. In addition, thermoplastic materials are increasingly being used in various aerospace applications. Forming fiber-reinforced thermoplastic structures, however, may be time consuming and costly using known formation processes.

One possibility is to use vibration welding for forming thermoplastic structures and structures made from other materials such as some metals. This can be particularly advantageous when forming hollow structures where access to the interior of the structure to form welds is limited and where forming the structure in a single operation is complex and expensive. Forming such structures by welding non-hollow components together can simplify the manufacturing process. There is a need in the art therefore for improved processes for forming hollow structures such as hollow fiber-reinforced thermoplastic structures which may decrease formation time, complexity and/or expense.

SUMMARY

According to an example of the disclosure, there is provided a method of forming a weld joint, the method comprising: providing a first component having a base portion and a flange extending from the base portion; providing a second component; bringing the second component and the flange into abutment and applying a load to the flange via the second component, wherein the flange is biased against the second component by a reaction of the first component to the load; and vibrating one of the first and the second components to form a weld joint between at least a part of the second component and at least a part of the flange.

In this example, or any of the following examples of the disclosure, the load may be a bending load.

It will be appreciated by those skilled in the art that, the disclosed method may require fewer components to form a weld joint than may be required by the prior art methods.

It will further be appreciated, that at least in some examples, when forming hollow structures by the disclosed method, there is no need for internal devices such as hard blocks or bladders to be used. The prior art requires use of such devices in the hollow space during the formation process to provide the required weld load. Eliminating the need for supporting means reduces tooling costs and reduces the welding cycle time by removing the step of inserting and removing these internal devices.

It will further be appreciated, that with certain component designs it is not possible to remove such internal devices after the forming process is complete. As such, the disclosed method may expand the variety of hollow structures than can be manufactured by vibration welding.

In any example of the disclosure, the first component may comprise a thermoplastic material.

In any example of the disclosure, the first component may comprise a first fiber-reinforced thermoplastic composite.

In any example of the disclosure, the first fiber-reinforced thermoplastic composite may comprise fibers, wherein the fibers may be: either continuous or discontinuous; and/or unidirectional; and/or arranged to resist the load; and/or arranged to stiffen the flange against the load.

In any example of the disclosure, the second component may comprise a thermoplastic material.

In any example of the disclosure, the second component may comprise a second fiber-reinforced thermoplastic composite.

In any example of the disclosure, the second fiber-reinforced thermoplastic composite may comprise fibers, wherein the fibers may be: either continuous or discontinuous; and/or unidirectional; and/or arranged to resist a load.

In any example of the disclosure, the flange or the first component may be formed to be resilient.

In any example of the disclosure, the first component may be formed such that the flange extends from the base portion at a first angle and wherein applying the load may change the first angle to a second, different angle.

In any example of the disclosure, the second angle may be smaller than the first angle.

In any example of the disclosure, the first component may be fixed in position and the second component may be moved relative to or pushed against the first component to apply the load to the flange.

In any example of the disclosure, the second component may be fixed in position and the first component may be moved relative to or pushed against the second component to apply the load to the flange.

According to a further example of the disclosure, a method of forming a hollow structure is provided, the method comprising: forming a first weld joint internal to the hollow structure by the method of any of the examples described herein; and forming a second weld joint between the second component and the first component to form the hollow structure.

In any example of the disclosure, the second weld joint may be formed by pushing the first and second components together during the vibrating one of the first and the second components to form the first weld joint.

In any example of the disclosure, the second component may be configured to fit over the first component.

In any example of the disclosure, the second component may comprise a base wall, a first side wall and a second side wall.

In some examples, at least part of the first side wall may be arranged to be welded to a flange of the first component.

In some examples, the second side wall may extend from the base wall and may be spaced from the first side wall.

In some examples, the second side wall may extend at an angle to the base wall.

In some examples, a mounting portion may be provided on the second side wall. The mounting portion may comprise a flange configured to be in engagement with the first component when the first and second components are assembled together.

In other examples, an end of the second side wall may be arranged to be vibration welded to the first component.

According to any example of the disclosure, the flange of the first component may be a first flange extending from the base portion at a first end thereof and the first component may further comprise a second flange extending from the base portion at a second end thereof. The second end may be opposite to the first end.

In some examples, two second components may be provided and arranged so as to form a weld joint with the first flange and the second flange respectively.

At least in some examples, each of the two second components may be arranged so as to also form a weld joint with the base portion.

At least in some examples, the method may comprise bringing each of the two second components and the respective first and second flanges into abutment and applying a respective load to the respective first and second flanges via the respective second components.

At least in some examples, a first load may be applied to the first flange and a second load may be applied to the second flange.

At least in some examples, the second load may act in a direction opposite to the first load.

At least in some examples, the second load may be substantially the same strength as the first load.

At least in some examples of the disclosure, the second component may comprise a base portion and a flange extending from the base portion, the method further comprising: bringing the first component and the flange of the second component into abutment and applying a second load to the flange of the second component via the first component, wherein the flange of the second component is biased against the first component by a reaction of the second component to the second load; and vibrating one of the first and the second components to form a weld joint between at least a part of the first component and at least a part of the flange of the second component.

From a further aspect of the disclosure, a structure formed by any of the methods described above is provided.

From a still further aspect of the disclosure, a hollow structure formed by any of the methods described above is provided.

According to another aspect, there is provided a welding system comprising: a first component having a base portion and a flange extending from the base portion; a second component; a welding machine for vibrating one of the first and the second components to form a weld joint at least between a part of the second component and the flange, wherein the system is configured to bring the second component and the flange into abutment and to apply a load to the flange via the second component, wherein the first component forms a spring to bias the flange to the second component.

According to another aspect, there is provided a welding system comprising: a first component having a base portion and a flange extending from the base portion; a second component; a welding machine for vibrating one of the first and the second components to form a weld joint at least between a part of the second component and the flange, wherein the system is configured to carry out the method of any of the examples described herein or to form a hollow structure of any of the examples described herein.

According to another aspect, there is provided a method of vibration welding, comprising: forming a first component to comprise a base portion and a flange extending from the base portion; bringing at least a part of a second component into contact with at least a part of the flange, wherein the first component forms a spring to bias the flange to the second component; and vibration welding the first and second components to form a weld joint between at least a part of the flange and at least a part of the second component.

The first component may comprise a thermoplastic material.

The first component may comprise a first fiber-reinforced thermoplastic composite.

In any example of the disclosure, the first fiber-reinforced thermoplastic composite may comprise fibers, wherein the fibers may be: either continuous or discontinuous; and/or unidirectional; and/or arranged to resist the load; and/or arranged to stiffen the flange against the load.

The second component may comprise a thermoplastic material.

The second component may comprise a second fiber-reinforced thermoplastic composite.

In any example of the disclosure, the second fiber-reinforced thermoplastic composite may comprise fibers, wherein the fibers may be: either continuous or discontinuous; and/or unidirectional; and/or arranged to resist a load; and/or arranged to stiffen the second component against the load.

The flange or the first component may be formed to be resilient.

The flange of the first component may be configured to deflect when the at least a part of the second component is brought into contact with the at least part of the flange.

The first component may be formed such that the flange extends from the base portion at a first angle before the at least a part of the second component is brought into contact with the at least part of the flange and wherein the flange deflects to from the first angle to a second, different angle when the at least a part of the second component is brought into contact with the at least part of the flange.

In any example of the disclosure, the second angle may be smaller than the first angle.

The first component may be fixed in position and the second component may be moved relative to or pushed against the first component to bias the flange to the second component.

The second component may be fixed in position and the first component may be moved relative to or pushed against the second component to bias the flange to the second component.

According to a further example of the disclosure, a method of forming a hollow structure is provided, the method comprising: forming a first weld joint internal to the hollow structure by the method of any of the examples described herein; and forming a second weld joint between the second component and the first component to form the hollow structure.

The second weld joint may be formed by pushing the first and second components together during the vibrating one of the first and the second components to form the first weld joint.

The second component may comprise a base portion and a flange extending from the base portion, the method further comprising: bringing the first component into contact with at least a part of the flange of the second component, wherein the second component forms a spring to bias the flange of the second component to the first component; and vibration welding the first and the second components to form a weld joint between at least a part of the first component and at least a part of the flange of the second component.

From a further aspect of the disclosure, a hollow structure formed by any of the methods described above is provided.

According to another aspect, there is provided a welding system comprising: a first component having a base portion and a flange extending from the base portion; a second component; a welding machine for vibrating one of the first and the second components to form a weld joint at least between a part of the second component and the flange, wherein the system is configured to bring the second component and the flange into abutment and to apply a load to the flange via the second component, wherein the first component forms a spring to bias the flange to the second component.

In any example of the disclosure, the first component may comprise a thermoplastic material.

In any example of the disclosure, the first component may comprise a first fiber-reinforced thermoplastic composite.

In any example of the disclosure, the first fiber-reinforced thermoplastic composite may comprise fibers, wherein the fibers may be: either continuous discontinuous; and/or unidirectional; and/or arranged to resist the load; and/or arranged to stiffen the flange against the load.

In any example of the disclosure, the second component may comprise a thermoplastic material.

In any example of the disclosure, the second component may comprise a second fiber-reinforced thermoplastic composite.

In any example of the disclosure, the second fiber-reinforced thermoplastic composite may comprise fibers, wherein the fibers may be: either continuous discontinuous; and/or unidirectional; and/or arranged to resist the load.

In any example of the disclosure, the flange or the first component may be formed to be resilient.

In any example of the disclosure, the first component may be formed such that the flange extends from the base portion at a first angle and wherein applying the load changes the first angle to a second, different angle.

In any example of the disclosure, the second angle may be smaller than the first angle.

In any example of the disclosure, the first component may be fixed in position and the second component may be moved relative to or pushed against the first component to apply the load to the flange.

In any example of the disclosure, the second component may be fixed in position and the first component may be moved relative to or pushed against the second component to apply the load to the flange.

In any example of the disclosure, a second weld joint may be formed between the second component and the first component to form the hollow structure.

The second weld joint may be formed by pushing the first and second components together during the vibrating one of the first and the second components to form the first weld joint.

In any example of the disclosure, the second component may be configured to fit over the first component.

In any example of the disclosure, the second component may comprise a base wall, a first side wall and a second side wall.

In some examples, at least part of the first side wall may be arranged to be welded to a flange of the first component.

In some examples, the second side wall may extend from the base wall and may be spaced from the first side wall.

In some examples, the second side wall may extend at an angle to the base wall.

In some examples, a mounting portion may be provided on the second side wall. The mounting portion may comprise a flange configured to be in engagement with the first component when the first and second components are assembled together.

In other examples, an end of the second side wall may be arranged to be vibration welded to the first component.

According to any example of the disclosure, the flange of the first component may be a first flange extending from the base portion at a first end thereof and the first component may further comprise a second flange extending from the base portion at a second end thereof. The second end may be opposite to the first end.

In some examples, two second components may be provided and arranged so as to form a weld joint with the first flange and the second flange respectively.

At least in some examples, each of the two second components may be arranged so as to also form a weld joint with the base portion.

At least in some examples, the system may be configured to bring each of the two second components and the respective first and second flanges into abutment and to apply a respective load to the respective first and second flanges via the respective second components, wherein the first component forms a spring to bias the first and second flanges to the respective second components.

At least in some examples, the system may be configured to apply a first load to the first flange and to apply a second load to the second flange.

At least in some examples, the second load may act in a direction opposite to the first load.

At least in some examples, the second load may be substantially the same strength as the first load.

BRIEF DESCRIPTION OF DRAWINGS

Certain examples of the disclosure will now be described by way of example only and with reference to the accompanying drawings in which.

DETAILED DESCRIPTION

Figure 1:
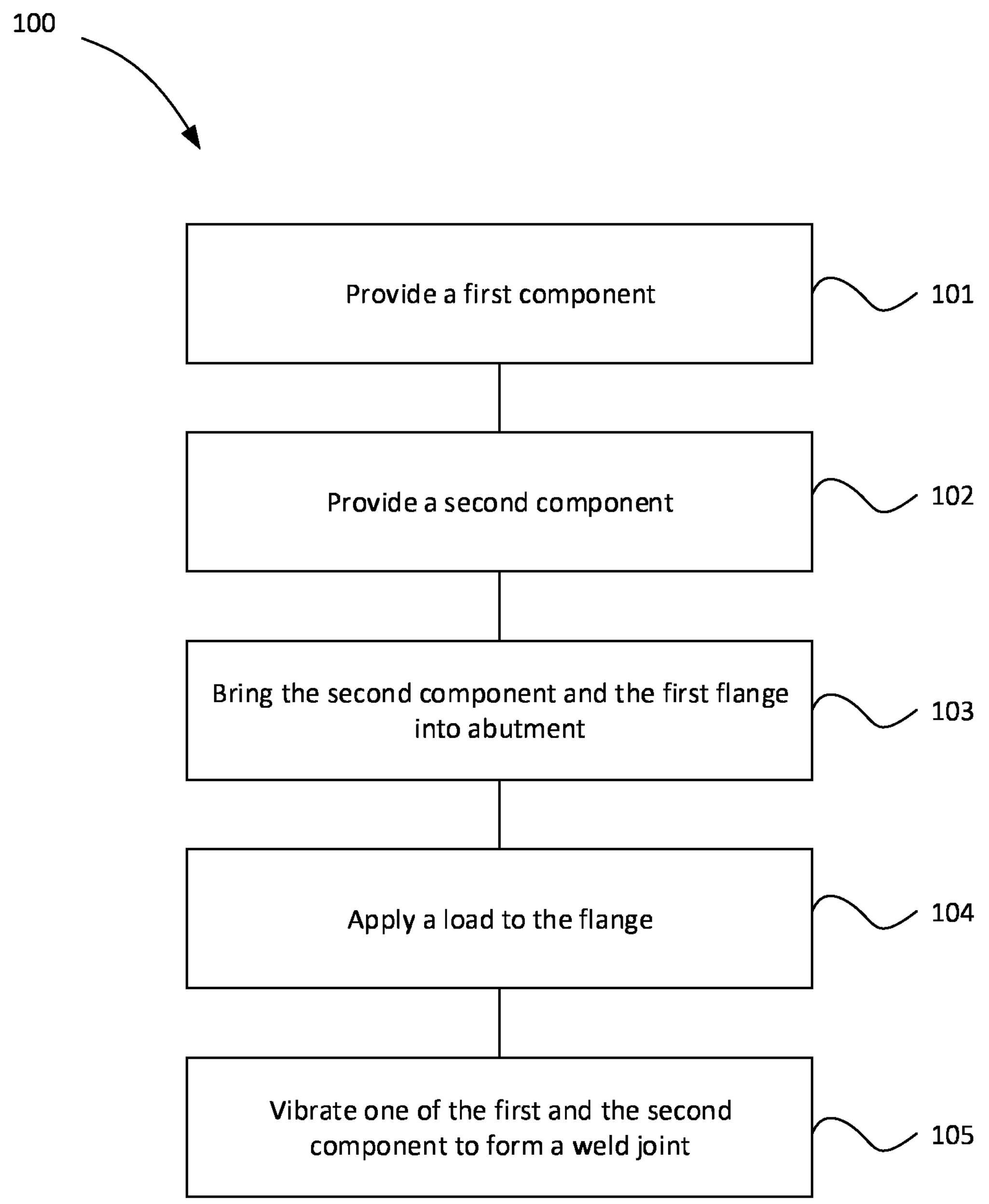
FIG. 1 shows a method of forming a weld joint according to various examples of the disclosure.

In any example, the disclosure may provide a method of vibration welding two components together. In vibration welding, the two components are brought into contact under pressure and one of the two components is vibrated relative to and against the other of the two components in order to generate heat at a welding interface between the two components. The heat from the generated friction between the components may melt a material of the components locally at the welding interface. The two components are fused or, in other words, welded together as the melted material re-solidifies once vibration has stopped. The pressure necessary to weld the components together is herein referred to as a weld load.

In any example of the disclosure, each of the two components may be constructed from a common or a unique material. The material may be any suitable material including a malleable metal such as aluminum or a thermoplastic. The material may also be a thermoplastic composite. Fiber reinforcements, for example, may be embedded within a thermoplastic material or, in other words, matrix to form a fiber-reinforced thermoplastic composite. Examples of the fiber reinforcements include but are not limited to metal fibers (e.g., aluminum fibers, brass fibers, and stainless steel fibers), carbon fibers (including graphite fibers such as polyacrylonitrile (PAN)-based carbon fibers, rayon-based carbon fibers, lignin-based carbon fibers, and pitch-based carbon fibers, insulating fibers (e.g., glass fibers), organic fibers (e.g., aramid fibers, polyparaphenylene benzoxazole (PBO) fibers, polyphenylene sulfide fibers, polyester fibers, acrylic fibers, nylon fibers, and polyethylene fibers), and inorganic fibers (e.g. silicon carbide fibers and silicon nitride fibers). Some or all of these fibers may be continuous fibers. Some or all of the fibers may also or alternatively be discontinuous, for example some or all of the fibers may be chopped fibers.

Examples of the thermoplastic material include, but are not limited to, a semicrystalline thermoplastic resin and an amorphous thermoplastic resin. Examples of the semicrystalline thermoplastic resin include, but are not limited to, polyester, polyolefin, polyoxymethylene (POM), polyamide (PA), polyarylene sulfide, polyketone (PK), polyetherketone (PEK), polyether ether ketone (PEEK), polyether ketone ketone (PEKK), polyvinylidene fluoride (PVDF), polytetrafluoroethylene (PTFE), polyaryletherketone (PAEK), polyether nitrile (PEN), fluororesin, and liquid crystal polymer (LCP). Examples of the polyester include, but are not limited to, polyethylene terephthalate (PET), polybutylene terephthalate (PBT), polytrimethylene terphthalate (PTT), polyethylene naphthalate (PEN), and liquid crystal polyester. Examples of the polyolefin include, but are not limited to, polyethylene (PE), polypropylene (PP), and polybutylene. An example of the polyarylene sulfide includes, but is not limited to, polyphenylene sulfide (PPS). An example of the fluororesin includes, but is not limited to, polytetrafluoroethylene. Examples of the amorphous thermoplastic resin include, but are not limited to, polystyrene, polycarbonate (PC), polymethyl methacrylate (PMMA), polyvinyl chloride (PVC), polyphenylene ether (PPE), polyimide (PI), polyamide imide (PAI), polyetherimide (PEI), polysulfone (PSU), polyether sulfone (PES), and polyarylate (PAR).

In any example of the disclosure, each of the two components may be constructed from one or more layers. Each or some of these component layers may include fiber reinforcements within a thermoplastic material. Within each component layer, the fiber reinforcements may be unidirectional. The fiber reinforcements may alternatively be multidirectional (e.g., in a woven sheet, a mat of chopped fibers, etc.) in one or more of the component layers.

In any example of the disclosure, each of the two components may include between twenty percent (20%) and eighty percent (80%) of the fiber reinforcement (e.g., fibers) per unit of volume and between twenty percent (20%) and eighty percent (80%) of the thermoplastic material per unit of volume. In any example, one or more component layer in a respective component may include between thirty-five percent (35%) and eighty percent (80%) of the fiber reinforcement (e.g., fibers) per unit of volume and between twenty percent (20%) and sixty-five percent (65%) of the thermoplastic material per unit of volume.

Figure 2B:
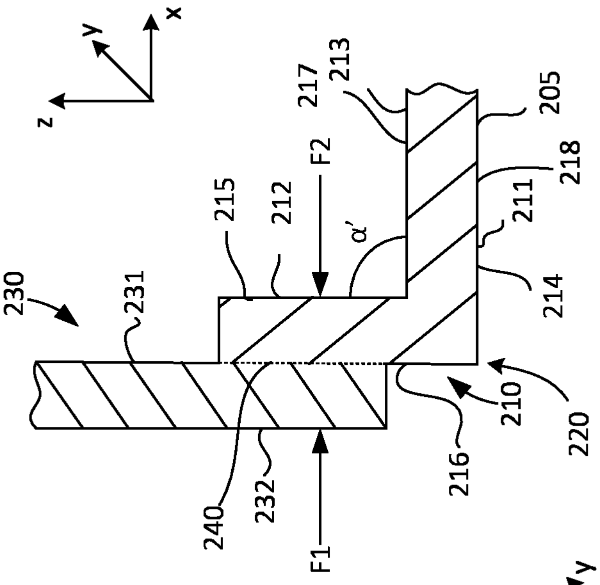
FIG. 2B shows a schematic view of the first component and the second component of FIG. 2A during forming the weld joint according to various examples of the disclosure.
Figure 2C:
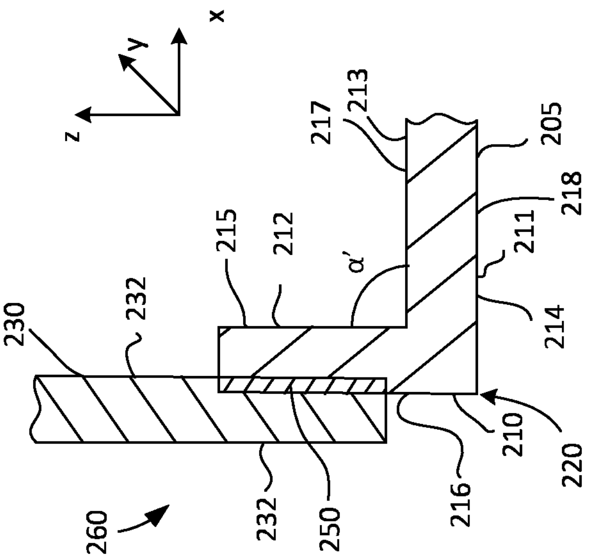
FIG. 2C shows a schematic view of the first component and the second component of FIG. 2A consequent to forming the weld joint according to various examples of the disclosure.
Figure 2A:
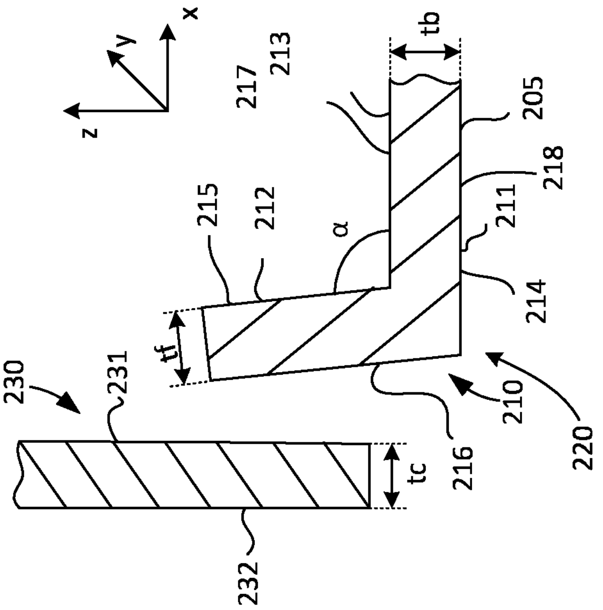
FIG. 2A shows a schematic view of a first component and a second component prior to forming a weld joint according to various examples of the disclosure.

FIG. 1 illustrates a flow diagram of a method 100 of forming a weld joint according to an example of the disclosure. FIG. 2A-2C illustrate a schematic sectional view of part of an example first component 210 and part of an example second component 230 at various stages in a welding method according to the disclosure.

In the method 100, a first component is provided (step 101). The first component comprises a base portion and a flange extending from the base portion. The first component may be made of any suitable material as discussed above. In any example of the disclosure, the first component may be made of a thermoplastic composite, such as a fiber-reinforced thermoplastic. The first component may be formed using one or more formation processes such as, for example laminating, molding, pressing, injection molding, stamp forming, continuous compression molding and overmolding. The first component may comprise a first fiber-reinforced thermoplastic composite.

A second component is also provided (step 102). The second component may again be made of any suitable material as discussed above. In any example of the disclosure, the second component may be made of a thermoplastic composite, such as a fiber-reinforced thermoplastic. The second component may be formed using one or more formation processes such as, for example laminating, molding, pressing, injection molding, stamp forming, continuous compression molding and overmolding. The second component may be formed of a different material and/or may be formed by a different formation process from the first component. The second component may comprise a second fiber-reinforced thermoplastic composite. The second fiber-reinforced thermoplastic composite may differ from the first fiber-reinforced thermoplastic composite in at least one of length, direction, volume-fraction and material of the fiber reinforcements. The second fiber-reinforced thermoplastic composite may differ in thermoplastic material from the first fiber-reinforced thermoplastic composite. In some examples, the second component may not comprise fiber-reinforcements at all.

In the method 100, the flange of the first component and the second component are then brought into abutment with one another (step 103) and a load is applied to the flange (step 104). This causes the flange to be biased against the second component as will be described in further detail below. It will be understood that the steps of bringing the first and second components into abutment and of applying a load to the flange may be carried out in a single step, for example by pushing the second component against the first component when the first component is fixed.

After the load has been applied to the flange, one of the first and second components is vibrated relative to the other to form a weld joint between at least a part of the flange and at least a part of the second component (step 105).

It will be understood that the first and second components may take various different forms. FIG. 2A illustrates a schematic sectional view of part of a first component 210 and part of a second component 230 according to an example of the disclosure and prior to vibration welding, for example at steps 101 and 102 of the method 100. The first component 210 comprises a base portion 211 and a flange 212. The flange 212 is arranged to be vibration welded to the second component 230. The base portion 211 may comprise a generally flat first planar surface 213 and a generally flat second planar surface 214 which may extend parallel to and opposite the first planar surface 213 to define a thickness tb of the base portion 211.

The flange 212 may comprise a generally flat first planar surface 215 and a generally flat second planar surface 216 which may extend parallel to and opposite the first planar surface 215 to define a thickness tf of the flange 212. The flange 212 extends from the base portion 211 of the first component 210 at an angle α, where the angle α is defined as the angle between the first planar surface 213 of the base portion 211 and the first planar surface 215 of the flange 212. Although illustrated as an obtuse angle, the angle α may instead comprise a right angle or an acute angle. The flange 212 and the base portion 211 may form a unitary structure. A juncture 220 is formed between the flange 212 and the base portion 211. The juncture 220 may comprise a bend or a corner. The first planar surface 213 of the base portion 211 and the first planar surface 215 of the flange 212 may therefore form a continuous surface. Further, they may form a first outer surface 217 of the first component 210. The second planar surface 214 of the base portion 211 and the second planar surface 216 of the flange 212 may form a continuous surface. Further, they may form a second outer surface 218 of the first component 210. The second component 230 may also comprise a first generally flat, planar surface 231 and a second generally flat, planar surface 232, which may extend parallel to and opposite the first planar surface 231 to define a thickness t, of the second component 230. The second component 230 may be generally flat.

It will be understood that in any example of the disclosure any of the thicknesses of the base portion 212, the flange 211 and the second component 230 may be constant along a length thereof or may vary depending on the required shape of the first and second components. In any example of the disclosure, any of the thicknesses of the base portion 212, the flange 211 and the second component 230 may be selected with consideration to the material properties of the respective component. It will further be understood that the magnitude of the load applied to the flange in step 104 may be selected with consideration to any of the above thicknesses and/or respective material properties (for example the stiffness module).

FIG. 2B illustrates a schematic view of the first component 210 and the second component 230 of FIG. 2A after the first and second components 210, 230 have been brought into abutment (in step 103) so as to apply a load F1 to the flange 212 of the first component 210 (step 104). As seen in FIG. 2B, after the bending load F1 has been applied, the flange 212 is bent to an angle α' relative to the base portion 211. The angle α' is less than the angle α. When the flange is at the angle α' from the base portion 211, a welding interface 240 is formed between at least a part of the second surface 216 of the flange 212 and at least a part of the first planar surface 231 of the second component 230.

The welding interface 240 may be provided on a portion of the first planar surface 231 of the second component 230 and/or on a portion of the flange 212. The first planar surface 231 of the second component 230 and the second planar surface 216 of the flange 212 may lie in the same plane when the flange 212 is bent to the angle α'. The first surface 231 of the second component 230 and the flange 212 are in contact with one another. The welding interface 240 lies in a first plane. In the example of FIG. 2B, the first plane is the z-y plane but it will be appreciated that this is only one possible example.

The flange 212 of the first component 210 and the second component 230 may be brought into abutment with one another (step 103) and a load may be applied to the flange 212 (step 104) in various different ways. In a first set of examples, the first component 210 is fixed in position and the second component 230 is moved relative to the first component 210 or pushed against the first component 210. The second component 230 is configured to move towards the first component 210 to bring the components into abutment. The second component 230 is pushed against the flange 212 of the first component 210 so as to apply a load F1 thereto (step 104). Movement of the base portion 211 of the first component 210 is restricted in the direction of movement of the second component 230. The base portion 211 thus acts as a fixed end with regards to the flange 212. The load F1 may be a bending load. The second component 230 is moved towards the first component in a direction normal to the first plane (for example normal to the welding interface). The flange 212 is compressed due to the second component 230 being pushed towards the first component 210. The compression of the flange 212 is resisted by a reaction force F2 generated by the flange 212 or the first component 210. The reaction force F2 generated by the first component 210 under the load F1 biases the flange 212 against the second component 230. In this regard, the first component 210 may form a spring to bias the flange 212 to the second component 230. Contact between the second surface 216 of the flange 212 and the first planar surface 231 of the second component 230 is maintained as a result of the reaction force F2. The first and second component 210, 230 are thus held into contact at the welding surface 240 under pressure. The reaction force F2 may be a spring back force. The pressure exerted on the second component 230 by the first component 210 may act to generate a spring back force on the welding interface 240 between the flange 212 and the second component 230, The force may be great enough to allow the flange 212 to be welded to the second component 230 during the vibration welding process. In examples, the pressure across the welding surface 240 may vary. The pressure may be strongest towards the juncture 220 between the flange 212 and the base portion 211.

In a second set of examples, the second component 230 is fixed in position and the first component 210 is moved relative to the second component 230 or pushed against the second component 230. The first component 210 is configured to move towards the second component 230 to bring the components into abutment. The flange 212 of the first component 210 is pushed against the first planar surface 231 of the second component 230 so as to apply a load to the flange 212 of the first component 210 (step 104). Movement of the second component 230 is restricted in the direction of movement of the first component 210. The load applied to the flange 212 may be a bending load. The base portion 211 thus acts as a fixed end with regards to the flange 212. The first component 210 is moved in a direction normal to the first plane (i.e. normal to the welding interface). The flange 212 is compressed due to the first component 210 being pushed towards the second component 230. The compression of the flange 212 is resisted by a reaction force F2. The reaction generated by the first component 210 under the load F1 biases the flange 212 against the second component 230. In this regard, the first component 210 may form a spring to bias the flange 212 to the second component 230. Contact between the between the second surface 216 of the flange 212 and the first planar surface 231 of the second component 230 is maintained as a result of the reaction force F2. The first and second component 210, 230 are thus held into contact at the welding surface 240 under pressure. The reaction force F2 may be a spring back force. The pressure exerted on the second component 230 by the first component 210 may be sufficient to weld the flange 212 to the second component 230 during the vibration welding process. In examples, the pressure across the welding surface 240 may vary. The pressure may be strongest towards the juncture 220 between the flange 212 and the base portion 211.

It will be understood that in any example of the disclosure, the first component may comprise fibers that are arranged so as to stiffen the flange against the load. In examples, the fibers may be unidirectional or aligned in substantially the same direction so that the fibers are loaded under compression when the load is applied to the flange.

In step 105 of the method 100 of FIG. 1, one of the first and the second components is vibrated relative to the other one of the first and the second components to weld the first and second components together. In some examples therefore, the first component 210 is vibrated and the second component 230 is held stationary. In other examples, the second component 230 is vibrated and the first component 210 is held stationary. The vibration may occur within the first plane (or in other words, in the plane of the welding interface 240). With reference to the example of FIG. 2B, the vibration may occur in any direction within the z-y plane. At least in some examples of the disclosure, the vibration is linear. In other examples, the vibration may be orbital.

FIG. 2C illustrates a schematic view of the first component 210 and the second component 230 of FIGS. 2A and 2B after vibration welding has occurred. A weld joint 250 is formed between the first and second components 210, 230. The weld joint 250 is formed at the welding interface 240. The first and the second components 210, 230 are therefore welded together to form a welded component 260.

There are a number of parameters that may be varied in the execution of the method 100. For example, it may be necessary to vary the thickness, the material properties and the structural features of the first and/or the second component depending on the desired application of the welded component formed. It may further be necessary to select appropriate load and welding frequency.

In one example of carrying out the method 100, the first component is a carbon fiber reinforced polyphenylene sulfide (Toray TC1105). The first component has varied thickness of 1.3-3.0 mm along the welding interface. The second component includes a glass fiber reinforced polyphenylene sulfide (Toray TC1100) plus carbon fiber reinforced polyphenylene sulfide (Toray TC1105). The second component has a thickness of 1.1 mm. The load applied to the flange is configured to apply a weld pressure of 6.5 MPa. The first component is vibrated relative to the second component at a weld frequency of 220 HZ.

The method described above can be used to form a number of different structures and components. These may have various configurations and may be used in a number of applications including but not limited to aeronautical, aerospace and automotive applications. In some examples, the method may be used to form a plurality of weld joints simultaneously. The plurality of weld joints may lie in the same plane or within different planes. It will be appreciated that the welding load necessary to form one or more weld joints according to any example of the disclosure is generated by the reaction force pushing the flange of the first component against a load. As such, there may be no need to provide supporting means, such as tooling, hard blocks and/or bladders, to generate a reaction force at the flange and to push the two components to be vibration welded together. As a result, tooling costs may be reduced, the vibration welding process may be simplified, and/or a high weld strength between the flange and the second component may be maintained.

Figure 3B:
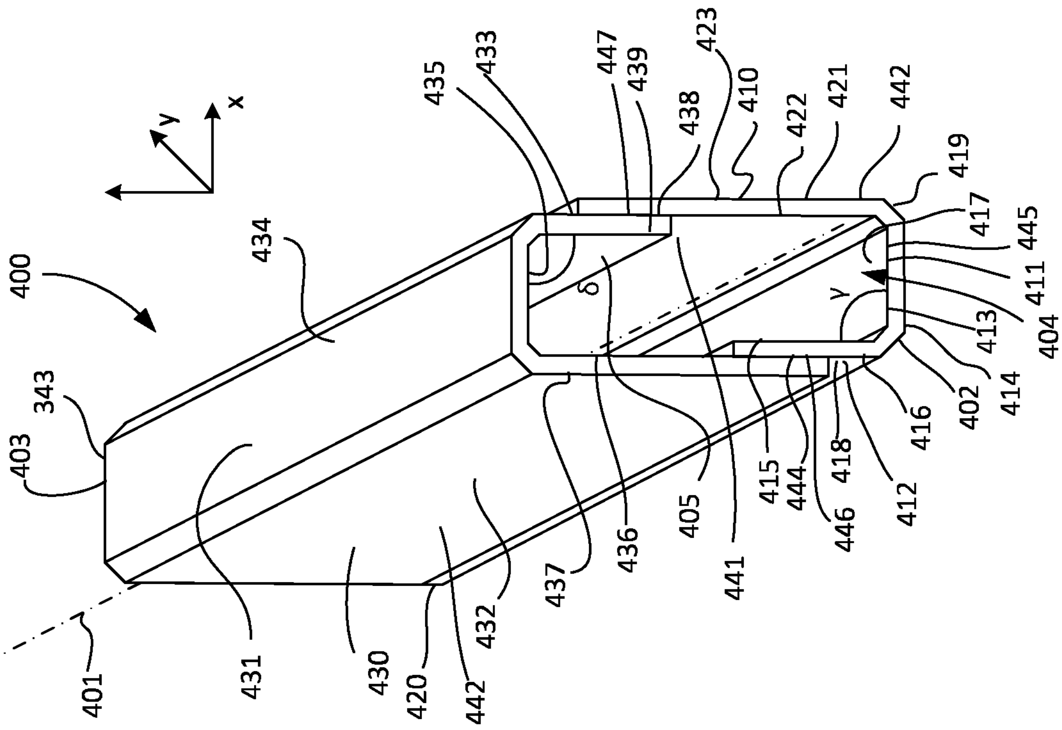
FIG. 3B shows another example hollow structure for a weld joint according to various examples of the disclosure.
Figure 3A:
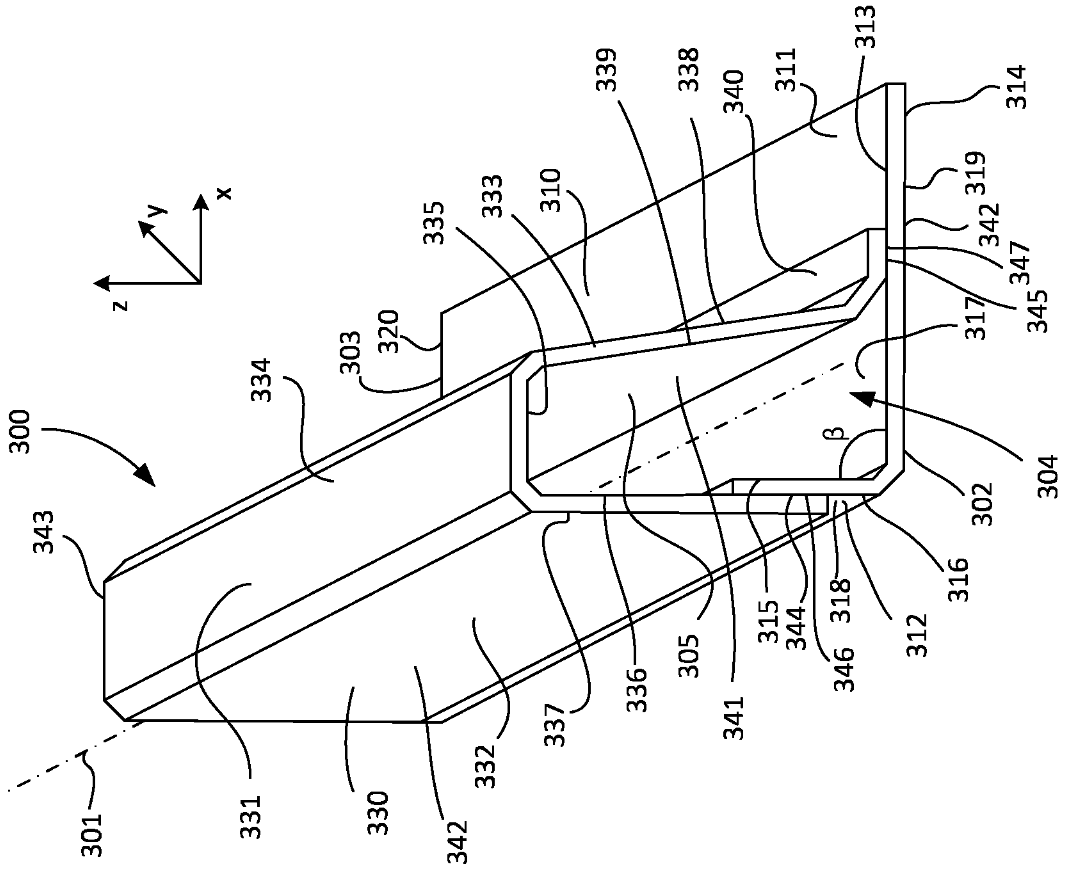
FIG. 3A shows an example hollow structure for a weld joint according to various examples of the disclosure.

FIG. 3A illustrates a cross-section of an example hollow structure 300, which can be manufactured using the method of forming a weld joint described above. FIG. 3B illustrates a cross-section of another example hollow structure 400, which can be manufactured by the method of forming a weld joint described above. It will be understood that the method of the disclosure may be advantageous at least in some such hollow structures where access to the interior of the structure in order to apply a welding load is limited. The term hollow structure is used herein to refer to a structure comprising an internal cavity. In at least some examples, the hollow structures may comprise a closed cross-section.

The structures 300, 400 of the examples shown are fiber-reinforced thermoplastic structures although other materials as described elsewhere in the specification could be used. Each of the structures 300, 400 may for example comprise or may be part of an aircraft component, such as an aircraft seat. The structures 300 and 400 may alternatively be configured as a part of a fuselage or a wing of the aircraft. The structures 300, 400 may still alternatively be configured as a part of a propulsion system or interior parts for the aircraft; e.g. a component of a nacelle, etc. The present disclosure, however, is not limited to the forgoing exemplary aircraft structures. Furthermore, it is contemplated that the structures 300, 400 of the present disclosure may also be configured for non-aircraft applications.

In some examples such as that of FIG. 3A, the structure 300 is generally tubular. The structure 300 extends along a longitudinal axis 301 from a first end 302 to a second end 303. A channel 304 extends longitudinally through the structure 300. The channel 304 extends along the longitudinal axis 301 between the first end 302 and the second end 303. The channel 304 is formed by an internal surface 305 of the structure 300. The channel 304 forms a cavity.

The structure 300 is formed by a first component 310 and a second component 330. The first and the second components 310, 330 are configured to be welded together to form the structure 300 in which the cavity formed by the channel 304 is internal to the closed cross-section formed by the first component 310 and the second component 330 when welded together.

In the example shown, the first component 310 comprises a base portion 311 and a flange 312 extending from the base portion at an angle β. It will be appreciated that the flange 312 is configured to be biased against the second component 330 when the first and second components are assembled together for welding. Thus, when the first and second components are not assembled together, the flange 312 may extend from the base portion at an angle greater than the angle β at which it extends when the first and second components are assembled together. The flange 312 is arranged to be vibration welded to the second component 330. The base portion 311 comprises a generally flat first planar surface 313 and a generally flat second planar surface 314 which may extend parallel to and opposite the first planar surface 313 to define a thickness of the base portion 311. The flange 312 comprises a generally flat first planar surface 315 and a generally flat second planar surface 316 which may extend parallel to and opposite the second planar surface 316 to define a thickness of the flange 312. The angle β is defined as the angle between the first planar surface 313 of the base portion 311 and the first planar surface 315 of the flange 312.

The flange 312 and the base component 311 may form a unitary structure. The first planar surface 313 of the base portion 311 and the first planar surface 315 of the flange 312 may therefore form a first inner surface 317 of the first component 310. The second planar surface of 314 the base portion 311 and the second planar surface 316 of the flange 312 may form a first outer 318 surface of the first component 310.

The first component 310 extends between a first end 319 and a second end 320 thereof. The first component 310 extends along the longitudinal axis 301. The first component 310 may have a uniform cross-section along its length. The first component 310 comprises a generally L-shaped cross-section.

In the example shown, the second component 330 forms an inverted U shape and is configured so as to fit over the first component. The second component comprises a base wall 331, a first side wall 332 and a second side wall 333. The base wall 331 is substantially planar. The base wall 331 comprises a first base surface 334 and a second base surface 335. The first base surface 334 is generally flat and planar. The second base surface 335 is parallel to and opposite the first base surface 334. The first side wall 332 extends from the base wall 331. The first side wall 332 may extend from the second base surface 335. The first side wall 332 may be perpendicular to the base wall 331. The first side wall 332 may comprise a first generally flat, planar surface 336 and a second generally flat, planar surface 337, which may extend parallel to and opposite to the first planar surface 311. At least part of the first side wall 332 is arranged to be welded to the flange 312. The second side wall 333 extends from the base wall 331 and is spaced from the first side wall 332. The second side wall 333 may extend from the second base surface 335. The second side wall 333 extends at an angle to the base wall 331. The second side wall 333 comprises a first generally flat, planar surface 338 and a second generally flat, planar surface 339, which may extend parallel to and opposite to the first planar surface 312. A mounting portion 340 may be provided on the second side wall 333. The mounting portion 340 may comprise a flange configured to be in engagement with the first component 310 when the first and second components are assembled together. The mounting portion 340 may be arranged to be vibration welded to the first component 310. In other examples, the second side wall 333 may not comprise the mounting portion 340 and an end of the second side wall 333 may instead be arranged to be vibration welded to the first component 310.

The base wall 331, the first side wall 332 and the second side wall 333 may form a unitary structure. The second base surface 335 of the base wall 331, the second planar surface 337 of the first side wall 332 and the second planar surface 312 of the second side wall 333 may therefore form an inner surface 341 of the second component 330. The first base surface 334 of the base wall 331, the first planar surface 311 of the first side wall 332 and the first planar surface 312 of the second side wall 341 may therefore form an outer 342 surface of the first component 310.

The second component 330 extends between a first end 343 and a second end 344 thereof. The second component 330 extends along the longitudinal axis 301. The second component 330 may have a uniform cross-section along its length. The second component 330 may comprise a generally U-shaped cross section as described above.

The internal surface 305 of the structure 300 is formed by the first inner surface 317 of the first component 310 and by a second surface 341 of the second component 330.

The first and second components 310, 330 when assembled as shown in FIG. 3A are joined together at a first welding interface 344 and at a second welding interface 345. The first and second component 310, 330 are joined by a first weld joint 346 at the first welding interface 344 and by a second weld joint 347 at the second weld interface 345. The first weld interface 344 lies within a first plane and the second weld interface 345 lies along a second, different plane. The first welding interface 344 is formed between the flange 312 and the first side wall 332. The first welding interface 344 is formed between the flange of the first component 310 and the second surface of the second component 330. The second welding interface may be formed between the base portion 311 and a mounting portion 340 of the second side wall 333. The second welding interface 344 may be formed between the second surface of the first component 310 and the second surface 341 of the second component 330.

During formation of the structure 300, one of the first and the second components 310, 330 is vibrated relative to the other one of the first and the second components 310, 330 whilst the first side wall 332 of the second component 330 is pushed against the flange 312 and the mounting portion 340 is pushed against the base portion 311 so as to weld the first and second components together. The first and second weld joints 346, 347 may be formed simultaneously. The first weld joint 346 may be formed by a method such as that described in relation to FIG. 1. The vibration is a linear vibration. The vibration occurs within the first plane (i.e. in the plane of the first welding interface 344) and within a second plane (i.e. a plane of the second welding interface 345). With reference to FIG. 3A, the vibration may occur in the y-direction.

FIG. 3B shows a structure 400 according to another example of the disclosure which is formed by a first component 410 and a second component 430. The first and the second components 410, 430 are both substantially U-shaped in cross section and are configured to be welded together to form the structure 400.

In some examples, the structure 400 is generally tubular. The structure 400 extends along a longitudinal axis 401 between a first end 402 and a second end 403. A channel 404 extends longitudinally through the structure 400. The channel 404 extends along the longitudinal axis 401 between the first end 402 and the second end 403. The channel 404 is formed by an internal surface 405 of the structure 400.

In the example shown, the first component 410 comprises a base portion 411, a flange 412 extending from the base portion at an angle γ to form a first side portion and a further, opposite side portion 421. It will be appreciated that the flange 412 is configured to be biased against the second component 430 when the first and second components are assembled together for welding. Thus, when the first and second components are not assembled together, the flange 412 may extend from the base portion at an angle greater than the angle γ at which it extends when the first and second components are assembled together.

The flange 412 is arranged to be vibration welded to the second component 430. The further side portion 421 is also arranged to be vibration welded to the second component 430 as will be described further below. The base portion 411 comprises a generally flat first planar surface 413 and a generally flat second planar surface 414 which may extend parallel to and opposite the first planar surface 413 to define a thickness of the base portion 411. The flange 412 comprises a generally flat first planar surface 415 and a generally flat second planar surface 416 which may extend parallel to and opposite the second planar surface 416 to define a thickness of the flange 412. The angle γ is defined as the angle between the first planar surface 413 of the base portion 411 and the first planar surface 415 of the flange 412. The further side portion 421 comprises a generally flat first planar surface 422 and a generally flat second planar surface 423 which may extend parallel to and opposite the second planar surface 422 to define a thickness of the side portion 421.

The flange 412, the base component 411 and the side portion 421 may form a unitary structure. The first planar surface 413 of the base portion 411, the first planar surface 415 of the flange 412 and the first planar surface 422 of the side portion 421 may therefore form a first inner surface 417 of the first component 410. The second planar surface of 414 the base portion 411, the second planar surface 416 of the flange 412 and the second planar surface 423 of the side portion 421 may form a first outer 418 surface of the first component 410.

The first component 410 extends between a first end 419 and a second end 420. The first component 410 extends along the longitudinal axis 401. The first component 410 may have a uniform cross-section along its length. The first component 410 comprises a generally U-shaped cross-section.

In the example shown, the second component 430 comprises a base wall 431, a first side wall 432 and a second side wall or flange 433. The base wall 431 is substantially planar. The base wall 431 comprises a first base surface 434 and a second base surface 435. The first base surface 434 is generally flat and planar. The second base surface 435 is parallel to and opposite the 434. The first side wall 432 extends from the base wall 431. The first side wall 432 may extend from the second base surface 435. The first wall 432 may be perpendicular to the base wall 431. The first wall 432 comprises a first generally flat, planar surface 436 and a second generally flat, planar surface 437, which may extend parallel to and opposite to the first planar surface 437. At least part of the first side wall 432 is arranged to be welded to the flange 412. The second side wall 433 extends from the base wall 431. The second side wall 433 may extend from the second base surface 435. The second side wall 433 extends at an angle to the base wall 431. The second side wall 433 comprises a first generally flat, planar surface 438 and a second generally flat, planar surface 439, which may extend parallel to and opposite to the first planar surface 438. The second side wall 443 is a flange. The second side wall 433 extends from the base wall 431 at an angle δ. The angle δ is defined as the angle between the first planar surface 435 of the base portion 431 and the first planar surface 439 of second side wall 433. It will be appreciated that the second side wall 433 is configured to be biased against the first component 410 when the first and second components are assembled together for welding. Thus, when the first and second components are not assembled together, the second side wall 433 may extend from the base portion 431 at an angle greater than the angle δ at which it extends when the first and second components are assembled together.

The base wall 431, the first side wall 432 and the second side wall 433 may form a unitary structure. The second base surface 435 of the base wall 431, the second planar surface 437 of the first side wall 432 and the second planar surface 449 of the second side wall 433 may therefore form an inner surface 441 of the second component 430. The first base surface 434 of the base wall 431, the first planar surface 411 of the first side wall 432 and the first planar surface 438 of the second side wall 441 may therefore form an outer 442 surface of the first component 410.

The second component 439 extends between a first end 444 and a second end 444. The second component 430 extends along the longitudinal axis 401. The second component 430 may have a uniform cross-section along its length. The second component 430 may comprise a generally U-shaped cross section. The first component 410 and second component 430 may comprise a substantially identical cross-section and may be assembled together by inserting the open end of the second component 430 into the open end of the first component 310.

The internal surface 405 of the structure 400 when assembled is formed by the first inner surface 417 of the first component 410 and by a second surface 441 of the second component 430.

The first and second components 410, 430 are joined together at a first welding interface 444 and at a second welding interface 445. The first and second component 410, 430 are joined by a first weld joint 446 at the first welding interface 4444 and by a second weld joint 447 at the second weld interface 445. The first weld interface 444 lies within a first plane and the second weld interface 445 lies along a second, different plane. The second plane is parallel to the first plane. The first welding interface 444 is formed between the flange 412 and the first side wall 432. The first welding interface 444 is formed between the first surface of the first component 410 and the second surface of the second component 430. The second welding interface 445 is formed between the base portion 411 and the second side wall 433. The second welding interface 444 is formed between the second surface of the first component 410 and the first surface of the second component 430.

During formation of the structure 400, one of the first and the second components 410, 430 is vibrated relative to the other one of the first and the second components 410, 430 to weld the components together. The first and second weld joints 446, 447 may be formed simultaneously. The first and second weld joints 446, 447 may be formed by a method 100 such as that described in relation to FIG. 1. Thus, force may be applied to push the first side wall 432 inwardly against the flange 412 of the first component 410 and to push the further, opposite side portion 421 of the first component 410 inwardly against the second side wall 433. As described above, a reaction force will act to push the flange 412 back against the first side wall 432 and to push the second side wall 433 back against the further, opposite side portion 421, thus providing the required weld load. The vibration is a linear vibration. The vibration occurs within the first plane (i.e. in the plane of the first welding interface 444) and within a second plane (i.e. a plane of the second welding interface 445). With reference to FIG. 3B, the vibration may occur in the y-direction.

Hollow structures, such as the structures 300, 400 of FIGS. 3A and 3B, manufactured by the method disclosed herein may be difficult or even impossible to manufacture by other traditional methods. It will be appreciated that internal devices such as tooling, hard blocks and/or bladders have been inserted inside the hollow space defined by a hollow structure during manufacture. Such internal devices may provide a reaction force to bias a first component against another component to aid in providing a weld force for vibration welding. However, hollow structures comprising complex geometries or completely enclosed internal cavities may not allow for such internal devices to be recovered after the welding process has been completed. In addition, the welding interface may not be accessible in some hollow structures and in such circumstances, manufacture of the hollow component would not be possible without providing a means of providing a weld force to push the first and second components together at the weld interface as an internal device cannot be provided. The hollow structures formed by the method of the current invention can be formed without the need for any internal devices.

Figure 4:
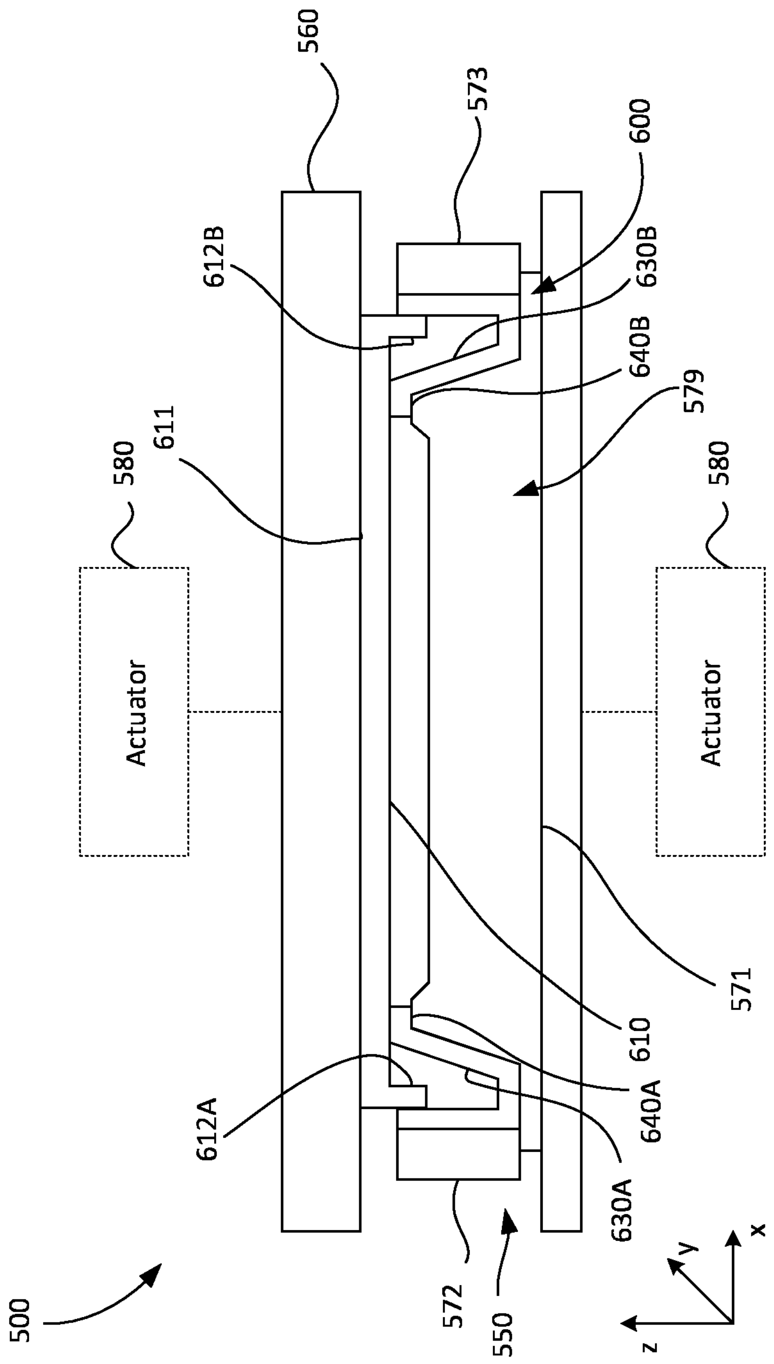
FIG. 4 shows a welding system according to various examples of the disclosure.

FIG. 4 illustrates a welding system 500 which may be used in the method of FIG. 1. The system 500 may be used for forming at least one weld joint to form a structure 600. The structure 600 of this example is similar to the hollow structure 300 shown in FIG. 3A, and thus a detailed description is omitted for conciseness. The structure 600 differs from the structure 300 in that it is formed of a first component 610 and two second components 630A and 630B. Each of the two second-components 630A and 630B is identical to the other but mirrored in construction.

The first component 610 comprises a first flange 612A extending from the base portion 611 at a first end thereof and a second flange 612B extending from the base portion 611 at a second, opposite end thereof.

When the structure 600 is assembled and/or completed, the first one of the second components 630A is arranged such that it is welded to the first flange 612A and the base portion 611, while the second one of the second components 630B is arranged such that it is welded to the second flange 612B and the base portion 611.

The welding system 500 comprises the first component 610, the two second components 630A, 630B and a welding machine 550. The welding machine 550 is adapted to vibrate one component with respect to another, and may also comprise a set of tooling to locate and hold components in contact with one another and/or means for applying force to a welding interface formed between components. The welding machine may comprise means for vibrating one or more of the components. The means for vibrating may comprise an oscillating platform. The oscillating platform may be actuated by an electromagnetic motor or by hydraulics. The set of tooling may include any number of fixtures, jigs or fasteners for securing and locating components to the welding machining 550. The means for applying force may comprise a lifting platform configured to bring the first and second components in contact with one another. The means for applying force may alternatively or additionally include any number of actuators 580. The welding process may be carried out at a frequency range between 200 and 240 Hz, and at amplitudes between 0.3 and 2.0 mm.

The first component 610 may be arranged on the welding machine 550 with a first group of tooling (not shown). The first group of tooling may secure the first component to the oscillating platform 560. The first group of tooling may be configured to restrict motion of the first component 610 relative to the means of vibrating. In this regard, the first component 610 vibrates with the oscillating platform 560. The second components 630A, 630B may be arranged with a second group of tooling 570. The second group of tooling 570 may be configured to locate the second components 630A and 630B in relation to one another and to the first component 610. The second group of tooling 570 may comprise a base tool 571, a first side tool 572 and a second side tool 573.

The side tools 572, 573 are configured to apply a load to the flanges 612A, 612B of the first component 610. The side tools 572, 573 may be actuated to push inwardly, in some examples towards each other. The side tools 572, 573 may act to push each of the second components 630A, 630B against the respective flanges 612A, 612B of the first component 610. In other examples, the side tools 572, 573 may comprise a fixture configured to clamp the second components 630A, 630B against the respective flanges 612A, 612B of the first component 610.

The second group of tooling 570 may further comprise a tool 579 for applying a weld load by pushing the mounting portion 640A, 640B of each respective second component 630A, 630B against the base portion 611 of the first component 610.

During vibration welding, the first component 610 is vibrated by the oscillating platform 560 in relation to the second component 630A and 630B. After the step of vibrating the first component 610 is complete, the tooling may hold the first component 610 and the second components 630A, 630B in position until the thermoplastic material at each welding interface cools under pressure, re-solidifying and thereby providing the respective weld joint. Thereafter, the structure 600 formed by the welded first and second components is released from the tooling.

While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, but which are commensurate with the scope of disclosure. Additionally, while various examples of the disclosure have been described, it is to be understood that aspects of the disclosure may include only some of the described examples. Accordingly, the disclosure is not to be seen as limited by the foregoing description, but is only limited by the scope of the appended claims.

The invention claimed is:

1. A method of forming a hollow structure, the method comprising:

forming a first weld joint by:

providing a first component having a base portion and a flange extending from the base portion;

providing a second component;

bringing the second component and the flange into abutment and applying a load to the flange via the second component, wherein the flange is biased against the second component by a reaction of the first component to the load; and vibrating one of the first component and the second component to form the first weld joint between at least a part of the second component and at least a part of the flange; and forming a second weld joint between the second component and the first component to form the hollow structure;

wherein the first weld joint is internal to the hollow structure.

2. The method as claimed in claim 1, wherein the first component comprises a thermoplastic material.

3. The method as claimed in claim 2, wherein the first component comprises a first fiber-reinforced thermoplastic composite.

4. The method as claimed in claim 3, wherein the first fiber-reinforced thermoplastic composite comprises fibers;

the fibers are: either continuous or discontinuous; and/or unidirectional; and/or arranged to resist the load; and/or arranged to stiffen the flange against the load.

5. The method as claimed in claim 3, wherein
   the first fiber-reinforced thermoplastic composite comprises fibers;
   the fibers are one or more of: discontinuous, unidirectional, arranged to resist the load and arranged to stiffen the flange against the load.

6. The method as claimed in claim 3, wherein
   the first fiber-reinforced thermoplastic composite comprises fibers;
   the fibers are discontinuous.

7. The method as claimed in claim 1, wherein the second component comprises a thermoplastic material.

8. The method as claimed in claim 7, wherein the second component comprises a second fiber-reinforced thermoplastic composite.

9. The method as claimed in claim 1, wherein the flange or the first component is formed to be resilient.

10. The method as claimed in claim 1, wherein the first component is formed such that the flange extends from the base portion at a first angle and wherein applying the load changes the first angle to a second angle that is different than the first angle.

11. The method as claimed in claim 1, wherein the first component is fixed in position and the second component is moved relative to the first component or pushed against the first component to apply the load to the flange.

12. The method as claimed in claim 1, wherein the second component is fixed in position and the first component is moved relative to the second component or pushed against the second component to apply the load to the flange.

13. The method as claimed in claim 1, wherein the second weld joint is formed by pushing the first component and the second component together during the vibrating one of the first component and the second component to form the first weld joint.

14. The method as claimed in claim 1, wherein the second component comprises a base portion and a flange extending from the base portion, the method further comprising:
   bringing the first component and the flange of the second component into abutment and applying a second load to the flange of the second component via the first component,
   wherein the flange of the second component is biased against the first component by a reaction of the second component to the second load; and
   vibrating one of the first and the second components to form a weld joint between at least a part of the first component and at least a part of the flange of the second component.

15. A method of forming a weld joint, the method comprising:
   providing a first component having a base portion and a flange extending from the base portion at a first angle, the flange including a second planar surface;
   providing a second component including a first planar surface;
   bringing the second component and the flange into abutment and applying a load to the flange via the second component,
   wherein the flange is biased against the second component by a reaction of the first component to the load, wherein applying the load changes the first angle to a second angle that is different than the first, and the first planar surface and the second planar surface share a common plane when the load is applied; and
   vibrating one of the first component and the second component to form a weld joint between at least a part of the second component and at least a part of the flange;
   wherein the weld joint is formed at a weld interface and internal to the first planar surface and the second planar surface.

* * * * *